US012656447B2

(12) United States Patent
McNamara et al.

(10) Patent No.:  US 12,656,447 B2
(45) Date of Patent:  Jun. 16, 2026

(54) SYSTEM AND METHOD FOR INTREGRATED WIRELESS DATA TRANSMISSION WITH IMPLICIT LOCATION AND TIMESTAMP WITH A LOCATION SYMBOL

(71) Applicant: ADAPT IP COMPANY, Campbell, CA (US)

(72) Inventors: Michael McNamara, Campbell, CA (US); Philip T. Kennedy, Campbell, CA (US)

(73) Assignee: ADAPT IP COMPANY, Campbell, CA (US)

( * ) Notice: Subject to any disclaimer, the term of this patent is extended or adjusted under 35 U.S.C. 154(b) by 512 days.

(21) Appl. No.: 18/006,943

(22) PCT Filed: Jul. 29, 2021

(86) PCT No.: PCT/US2021/043641
§ 371 (c)(1),
(2) Date: Jan. 26, 2023

(87) PCT Pub. No.: WO2022/026666
PCT Pub. Date: Feb. 3, 2022

(65) Prior Publication Data
US 2023/0273288 A1     Aug. 31, 2023

Related U.S. Application Data

(60) Provisional application No. 63/058,301, filed on Jul. 29, 2020.

(51) Int. Cl.
*G01S 5/14*          (2006.01)
*G01S 5/02*          (2010.01)

(52) U.S. Cl.
CPC ............ *G01S 5/14* (2013.01); *G01S 5/02216* (2020.05)

(58) Field of Classification Search
CPC ...... G01S 5/14; G01S 5/02216; G01S 5/0205; G01S 11/08; Y02A 90/10
See application file for complete search history.

(56) References Cited

U.S. PATENT DOCUMENTS

| | | | |
|---|---|---|---|
| 10,397,779 B2 * | 8/2019 | Marri Sridhar | ..... H04L 61/5038 |
| 2006/0050625 A1 * | 3/2006 | Krasner | .................. G01S 1/04 370/208 |

(Continued)

FOREIGN PATENT DOCUMENTS

WO     WO-2013/043932 A1     3/2013

OTHER PUBLICATIONS

International Search Report for International Application No. PCT/US2021/043641, dated Nov. 18, 2021.

(Continued)

*Primary Examiner* — Nizar N Sivji
(74) *Attorney, Agent, or Firm* — DLA Piper LLP US

(57)          ABSTRACT

Techniques for efficient and accurate data collection employing many sensors distributed over an area is disclosed. The many data collection and transmission devices transmit the data in a novel manner that is the combination of a set of digital data packets which convey the data, integrated with a set of analog packets that enable the receiver to determine the distance between the transmitter and the receiver is disclosed. The receivers of this data are arranged so that they can receive each broadcast sample, and distributed geographically so that tri angulation techniques can be used to precisely locate each transmitter. Highly accurate clocks located only in the receivers are used to timestamp the acquired data. This design of the combination (Continued)

data packet enables use of inexpensive sensors to collect high quality data with accurate two and three-dimensional location and time stamps provided by the network of receivers.

10 Claims, 7 Drawing Sheets

(56) References Cited

U.S. PATENT DOCUMENTS

| | | | | |
|---|---|---|---|---|
| 2010/0309053 | A1* | 12/2010 | Asai | G01S 5/14 |
| | | | | 342/387 |
| 2011/0074627 | A1* | 3/2011 | Morrison | G01S 1/042 |
| | | | | 342/357.48 |
| 2012/0157117 | A1* | 6/2012 | Choi | H04W 64/00 |
| | | | | 455/456.1 |
| 2013/0070607 | A1* | 3/2013 | Sun | G01S 13/74 |
| | | | | 370/241 |
| 2016/0259032 | A1* | 9/2016 | Hehn | G01S 1/024 |
| 2017/0261592 | A1* | 9/2017 | Min | G01S 5/0264 |
| 2018/0213492 | A1* | 7/2018 | Xia | H04B 1/7183 |
| 2018/0254910 | A1* | 9/2018 | Dutz | H04W 12/0431 |
| 2018/0299539 | A1* | 10/2018 | Matsumoto | G01S 5/14 |
| 2019/0364536 | A1* | 11/2019 | Sadiq | H04W 64/003 |
| 2020/0273326 | A1* | 8/2020 | Shotton | G08G 1/0145 |

OTHER PUBLICATIONS

Written Opinion for International Application No. PCT/US2021/043641, dated Nov. 18, 2021.

Office Action for Mexican Patent Application No. MX/a/2023/001228, mailed Oct. 16, 2025, 5 pages.

Invitation to Amend dated Feb. 27, 2026 issued in Singapore Application No. 11202300621Y.

* cited by examiner

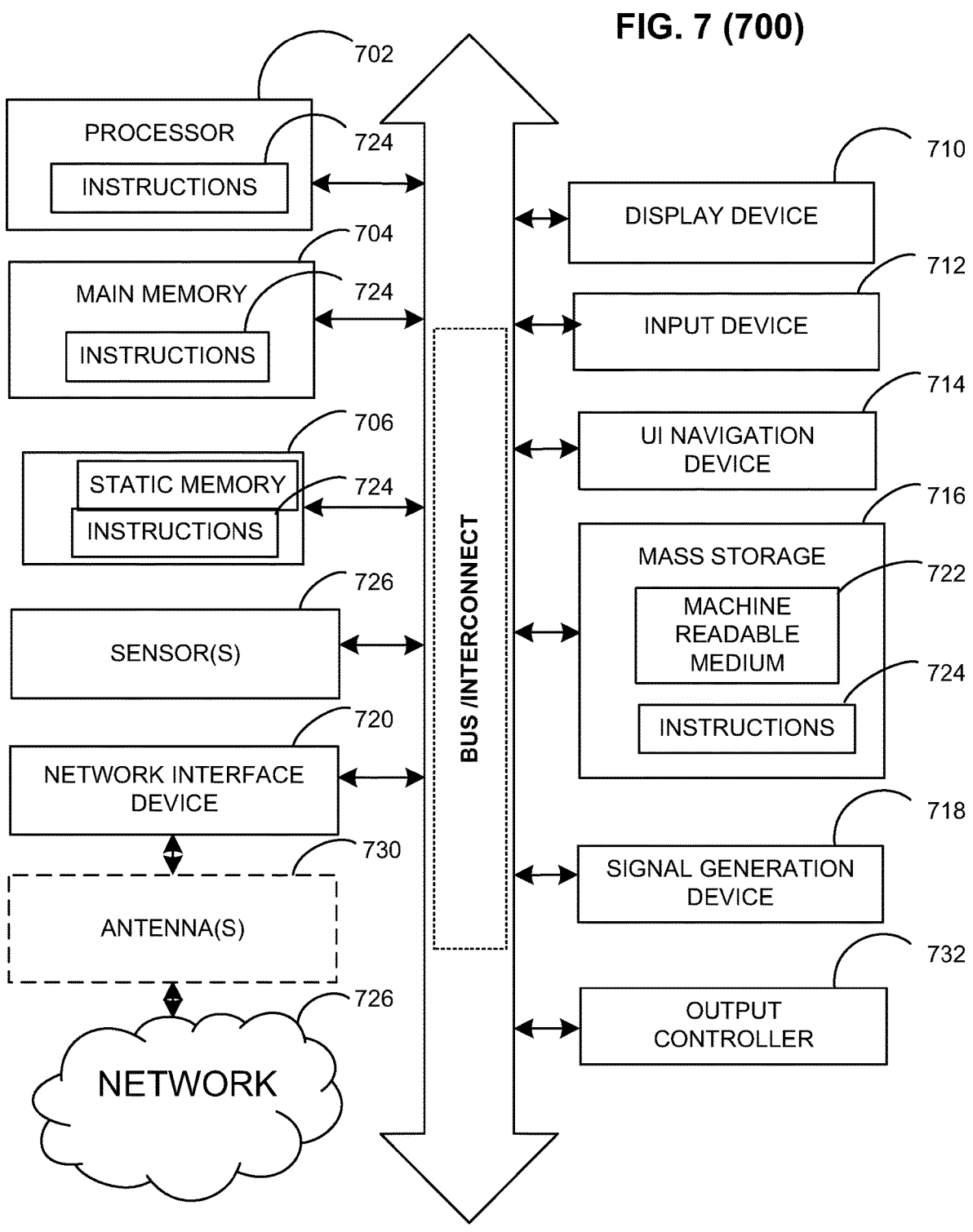
FIG. 7 (700)

SYSTEM AND METHOD FOR INTREGRATED WIRELESS DATA TRANSMISSION WITH IMPLICIT LOCATION AND TIMESTAMP WITH A LOCATION SYMBOL

CROSS-REFERENCE TO RELATED APPLICATIONS

This application is a U.S. National Stage Application of International Application No. PCT/US2021/043641, filed Jul. 29, 2021, which is based on and derives the benefit of the filing date of U.S. Provisional Application No. 63/058, 301, filed Jul. 29, 2020. Each of the foregoing are hereby incorporated herein by reference in their entireties.

BACKGROUND

Automated data collection systems may build a table of sensor data arranged by location and data timestamp. As an example, an automated weather monitoring system may comprise a number of devices ("Weather Stations") that each include (as an example) temperature, wind, humidity and rain sensors. These Weather Stations can be distributed across a geographical area, each recording the weather in their location. To be more useful, this weather data should be annotated with the location and the time that the data was captured and transferred to a central location (perhaps a website) for analysis and display. The location of the weather station could be obtained at the time of installation, perhaps by using a GPS device, or by noting the location on a map where the particular station was placed. The time a sample of data is captured could be determined by including a local clock in the weather station, perhaps synchronized with a radio broadcast, or simply free running. The approximate nature of the location and time the data collected in this weather monitoring example may introduce errors into the database. The data transfer technique could be a manual transfer of the data from each station via suitable storage media, or over a wired or wireless transmission of the data over the Internet to a central location.

Known technology available for automated data collection limits the accuracy of the information and requires significant power (typically supplied by batteries) to collect the data, hence limiting the quantity of data that can be collected.

Wireless communication devices based on standards such as IEEE 802.11 (WiFi), LORA and SigFox are widely used to operatively connect electronic devices via a radio frequency link. WiFi was designed to simplify the connection of computer peripherals by enabling transmission and reception of Ethernet packets (IEEE-802.3) over a wireless medium, rather than over a coaxial cable or twisted pair of conductors. LORA and SigFox were designed to transmit data between electronic devices using simpler protocols based on specific application needs.

Location detection devices based on receiving broadcast signals from well-known sources such as the satellites that make up the Global Positioning System, or based on the reception, and measurement of signal strength from WiFi router devices, cell phone base stations, or other beacons which are in well-known fixed location have been available and are in wide use since about 2005. GPS is quite accurate, delivering +/−8-meter accuracy, but requires a very sensitive receiver to acquire signal from a sufficient number of orbital satellites to deliver the accuracy. GPS signals are even more difficult to receive inside buildings or structures. Location determination based on reception of WiFi signals strength from routers is very imprecise, delivering +/−30 meters of accuracy; and again, require acquiring signal from three or more routers.

A recent IEEE draft standard (802.11az) proposes a Fine Time Measurement ("FTM") protocol, which defines the exchange of location packets between a station and the plurality of access points in the vicinity of the station, enabling the station to determine its location. This protocol requires the receiver to acquire messages from two or more well-known transmitters, and then download the location of these reference points from a database, and then use triangulation techniques to determine the location of the receiver with respect to these reference points. This measurement requires careful calibration of the signal path in the router access point and the station. The Station and the Router exchange a number of messages over time and record the time of flight of the messages. If the station, or any of the routers are moving, this must be considered as well to determine an accurate location.

An alternative method to determine distance between two points has a transmitter send a pulse that contains a fixed pattern of different frequencies and modulations with a well-defined phase relationship, and a receiver that acquires the signal, and compares the relationship between the frequencies and the phase relationships of the received signal with the reference signal, and derives the distance between the transmitter and the receiver based on the differences between the received and reference signal, such as how many rotations have occurred, and the wavelength of the signal. This technique is commonly used in radar and sonar applications, where often the transmitter and the receiver are at the same location, and the signal is reflected off of the object of interest, and hence the distance that is determined is then divided by two to determine the actual distance between the object and the transceiver.

Currently there are many systems deployed worldwide that gather data from a plurality of sensors and hold the data locally or transmit this data to an aggregation device. Some of these systems include a positioning technology that records the location from which the data was collected. Other systems depend on accurate initial placement of the sensor and faithful recording of the location data, and trust that the sensor will remain in the original location. Some of these systems include a clock that records the time at which the data was collected. Many such systems include a data transmission technology which many be wired or wireless, that communicates the data from where it was gathered to a place where it can be aggregated with other data and processed to produce a more complete picture of the information set made up of sensor data, location and time. Some systems combine the plurality of sensors, the accurate clock, the location positioning system, and the wireless transmission system into one battery operated device which can gather data, and determine the location, and transmit the data and the location to downstream receivers. Others rely on a deployment of several discrete components that perform each function. Once the data has been gathered, the backend system performs further analysis of the data that would be used to guide manual or automated decision processes in many areas, including but not limited to any of numerous commercial, life safety, or military applications.

Current sensor systems which are not based on the disclosed technology suffer from numerous inefficiencies; the first is the in the lack of accuracy of location. When location is measured by triangulating WiFi router signals, the first inefficiency is that each of these existing systems must determine their location based on several measurements made over time, between systems that each may be in motion, where one method is shown in FIG. 6. The second inefficiency is the power required to transmit and receive many messages in order to determine location, again as in FIG. 6. The power usage to send these messages drains the battery life of the mobile device that is determining its location, and also blocks other potential users of the wireless channel during the time of the many transmissions, and these other potential users of the wireless media must consume their own battery power while they listen to the ongoing location determining communication between the other systems, and once the channel is again clear they can transmit or receive their own message.

If instead a passive system such as GPS is used to determine location, the system must wait for, and consume battery power listening for the reception of a sufficient number of the typically very weak GPS packets transmitted from a number of geosynchronous GPS satellites, and then perform the math to calculate the system's location. Finally, data systems that rely on a static database of the deployed location of each sensor require very meticulous measurement of the placement of the sensors, which is very labor intensive. Further, the data integrity of such systems is at risk if any sensor is later moved. Once the system has determined its location by any of these means, the system must transmit an additional data packet including the location together with a current reading of the sensor data, plus perhaps a current value of time, to a report data gathering station, which will store the data locally, forward the data for further processing or both. This time lag between the location determination, the time stamp and data acquisition, and the transmission of the data to a processing location both introduces inaccuracies in the data set and consumes significant power (which often is supplied by a battery). Taken together this makes each of the data sensor devices a very complex device, with many demands on the battery; which limits the number of samples that can be captured, and the length of time that the characteristics of environment can be measured.

This disclosure describes technical solutions that overcome the aforementioned problems present in the known technologies.

BRIEF DESCRIPTION OF THE DRAWINGS

Specific examples have been chosen for purposes of illustration and description, and are shown in the accompanying drawings, forming a part of the specification.

FIG. 7 illustrates an exemplary machine configured to perform computing operations according to an embodiment of the present disclosure.

DETAILED DESCRIPTION

The disclosed technology relates generally to wireless communication devices which are designed to provide communication between devices via radio frequency link, combined with positioning systems, which are designed to automatically determine the location and altitude of a device. This disclosure describes a novel combination of a location positioning feature and a communication feature unified into a single packet, which is transmitted from a station device at an unspecified location and time, yet the communication network automatically determines with high accuracy the time and location of the data sample as a feature of the network, in a manner that does not require complex hardware or accurate clocks at the station device. This technology dramatically increases the accuracy of location and time components of the data collected while reducing the hardware cost and power requirements of the sensor devices.

As used herein, the term "Loci" describes modified packets that may include, in addition to the data symbols, the special symbols transmitted to facilitate location measurement; the term "Tag" describes a station device that may transmit Loci packets, instead of or in addition to the regular packets that make up the communication protocol; the term "Anchor" describes a station or access point device that receives and accepts Loci packets and derives the implicit distance, in addition to capturing the data contained in the Loci packet; and the term "Base Station" describes a station or access point that collects data from the Anchor points and assembles the table of sensor data The presently disclosed system may include several Tags, Anchors and a Base Station. Such a system would be able to collect data from all Tags located within the range of the Anchor stations.

A WiFi standard may use techniques of radio communication, where a message consists of a number of OFDM symbols that are transmitted over the chosen radio frequency by a transmitter, and then one or more receivers within the range of the transmission receive the symbols and decode them to recover the message.

The symbols that make up the message may be well-defined modulations of the radio spectrum, in one or more dimension, including the frequency domain, the amplitude domain, or other easy to generate and recognize patterns. The symbols may be constructed in a manner where they are distinct from each other, so that when transmitted in the presence of noise, the receiver can compare the received signal to one of a number of distinct possible matches, which each are significantly different from each other, so that it is less likely that one symbol will be confused for another.

Figure 1:
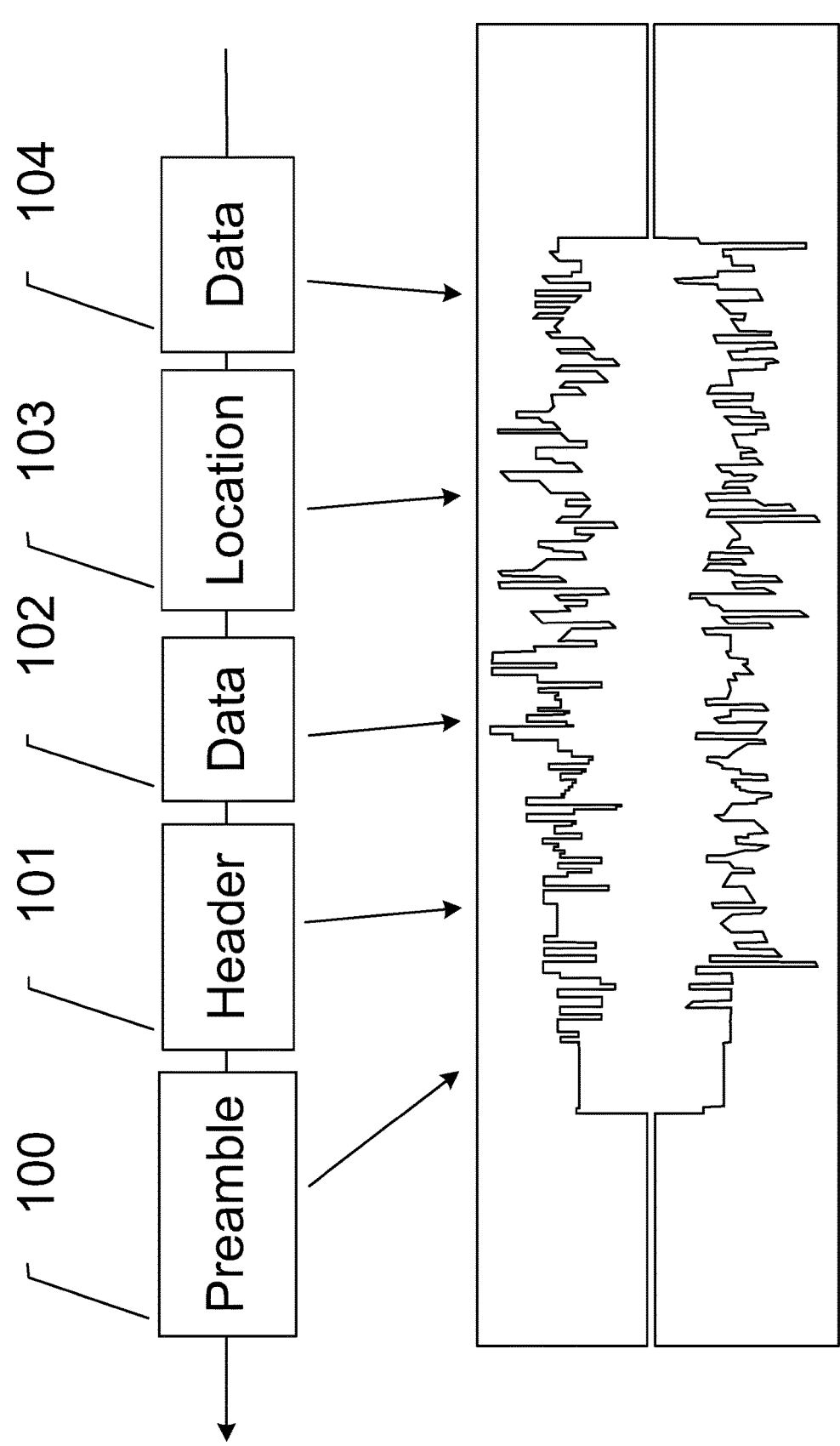
FIG. 1 illustrates one example of the transmission of a wireless data message, comprising several symbols of data that make up a preamble, a header, location symbols and data symbols.

A message may include first a number of simple symbols that are the preamble of the message; as shown in item 100 of FIG. 1, which are designed to enable the receiver to unambiguously detect, and for it to recognize typical impairments of these simple symbols, such as frequency offset, and deploy corrections on the subsequent symbols of the message for these impairments. The preamble is followed by a header, as shown in item 101 of FIG. 1, which describes the rest of the message, and details about its transmission parameters. Then the body of the message is sent in the remaining symbols, as shown in item 102 of FIG. 1, and these symbols may be highly encoded in order to transmit as much data as possible in a short amount of time.

The design of the WiFi symbols that make up a message enables messages to be transmitted and received even in the presence of significant noise in the channel, enabling reliable communication to take place in many different environments. The trade-off that makes this possible gives up some bandwidth to achieve the reliability, including techniques such as detection and correction of frequency and phase offsets between the transmitter and the receiver, and a transmission/acknowledgement/timeout/retransmission policy that provides automatic recovery if a channel quality begins to degrade; but these techniques give up latency—the message will be delivered, if possible, but it may take more or less time depending on how many symbols must be re-transmitted.

The symbols that make up the Loci packet, as shown in item 103 of FIG. 1, do not use the set of OFDM symbols to convey information, but instead consist of a complex waveform that contains many different frequencies and phase shifts, in a manner comparable to pulse signaling. The Loci portion of a message is followed by transmission of the remainder of the data symbols, as shown in item 104 of FIG. 1, and described in more detail in the next paragraphs.

Figure 2:
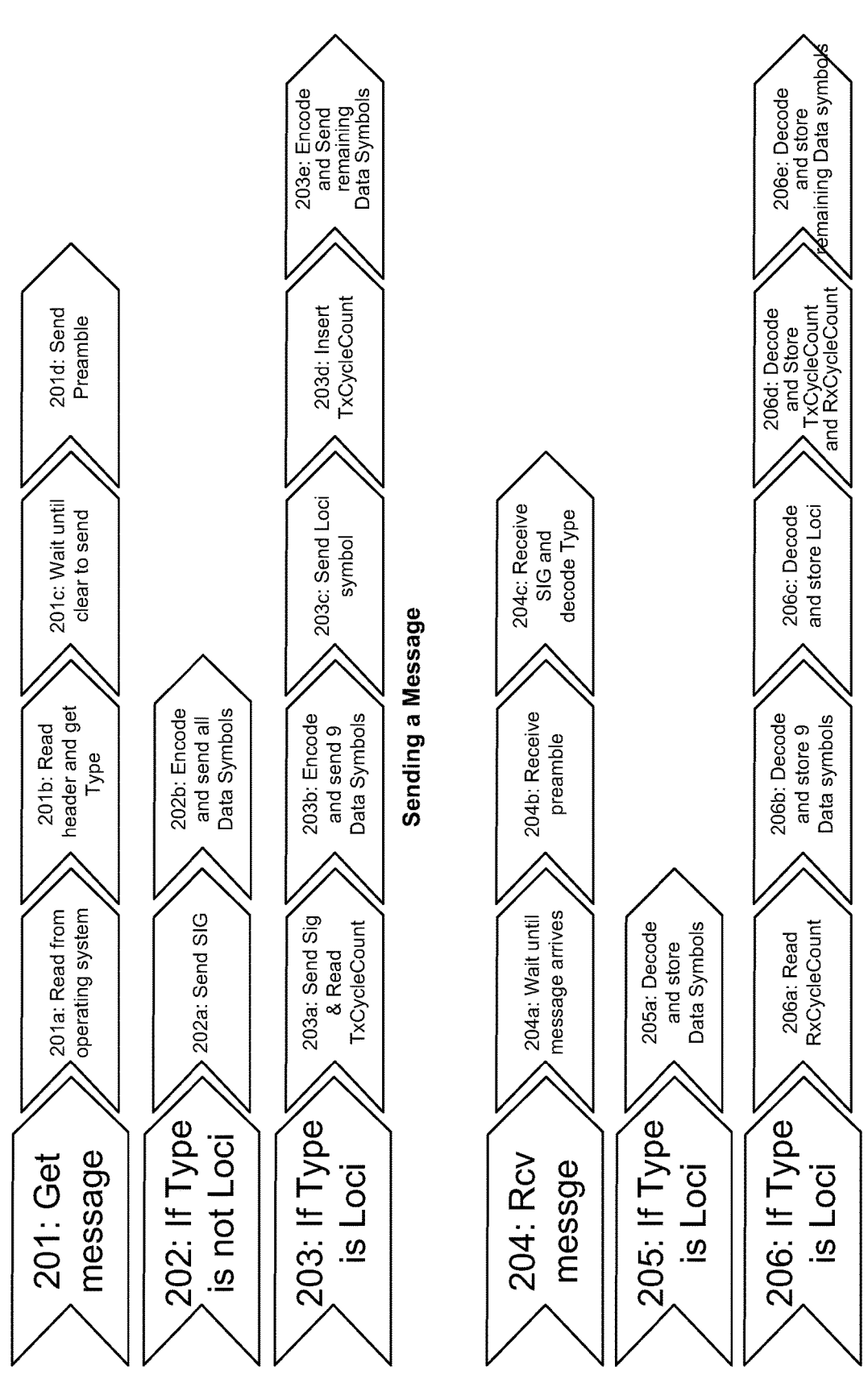
FIG. 2 illustrates in two sub parts, the first a flow chart of one example of how a system might determine whether to send a Loci packet, or a regular packet of the standard protocol, including detail of each high-level step of preparing and sending the message; and in the second part, a flow chart of how a packet transmitted according to the first flow chart might be received, decoded and processed.

An exemplary flow chart for sending a Loci is shown in FIG. 2. The operating system stores messages that are ready to be sent in a queue which is accessed by the transmission system (Tx). Tx gets the next message to send as show in step 201a, by reading the entry at the head of the queue (not shown). In step 201b, the Tx reads the Type field of the header. Then in 201c the Tx waits until it has permission to transmit a message, according to the specific rules of the protocol (WiFi, LTE, SigFox, Lora or others). When it has the right to send, the Tx sends (201d) the Preamble of the message. Up through this step the operation is identical to systems that do not support the Loci packet. If the Type read in step 201b was not the Loci type, the Tx system sends (step 202a) the (sub 1 GHz) SIG field of the message, which provides a succinct description of the rest of the message to any receivers. Then in step 202b, the Tx system sends the plurality of symbols that make up the body of the message, encoded as described in the SIG.

If the Type read in 201b was the Loci type, Tx in step 203a reads the value of a local free running cycle counter and stores this in a register as TxCycleCount; and at the same time sends the SIG field of the message. Then in step 203b, the Tx encodes and sends the first 9 data symbols of the message. The particular number of symbols sent can be adjusted to the particular protocol and must be sufficient to include the payload header of the message, especially the Type, in any possible encoding scheme for the message, so that the receiver can receive and decode the Type from the payload header before the Loci symbol arrives.

As used herein, the encoding of data into symbols (e.g. the Tx step 203b of FIG. 2) can be done according to the protocol in use. As a non-limiting example, one method for encoding the data into symbols is as follows. The binary data of the 8-bit wide bytes that make up the message is broken up into a series of bits. An encoding scheme is chosen based on the conditions of the wireless medium and the distance that the message is to be sent. Simpler schemes include fewer bits of data in each symbol; and more complicated schemes can send many more bits of data in each symbol. The simpler symbols can be received in the presence of lots of noise in the wireless medium, and over longer distances than the more complicated symbols. If an encoding scheme is chosen that can include 12 bits in each symbol, then the first 12 bits of the message are accessed from the byte stream, and the symbol that represents that pattern of data in the 12 bits is selected and is transmitted. Then the next twelve bits of data from the stream of bytes is accessed, and the symbol that represents that pattern is transmitted.

Once the initial data symbols have been transmitted, the Tx in step 203c transmits the Loci symbol, which is designed to facilitate distance measurement. After the Loci has been transmitted, the Tx in step 203d inserts the value of TxCycleCount as that was saved in step 203a as if it were regular payload of the data, and encodes this as bytes of the message, and then in step 203e, the Tx continues encoding the remaining bytes of the message and sends them. The encoding in these steps can be performed using a protocol as previously described.

While other implementations are possible, a possible flow chart for receiving a Loci is shown in FIG. 2. The receiving hardware (Rx), in step 204a of FIG. 2, samples the strength of signals in the wireless media, and when one is recognized, in step 204b, as corresponding to the preamble of messages of the supported protocol the system then, in step 204b, Rx captures the SIG field of the message, and decodes the Type.

If the Type received in step 204b was not the Loci type, the Rx, in step 205a, receives the plurality of symbols that make up the message, decodes them, and stores the decoded data in a receive queue (not shown) for the operation system to read.

If the Type received in step 204b was the Loci type, then in step 206a, the Rx reads the value of its free cycle counter and stores this in a register, called RxCycleCount. Then the Rx, in step 206b, decodes and stores the first 8 symbols of the message in the receive queue for the operating system to read. Then in step 206c, the Rx receives the Loci symbol as transmitted and modified by its flight through the wireless media, and saves the symbol for later processing. Then in step 206d, the Rx decodes the subsequent data symbols of the message, and records the value of the TxCycleCount, and stores this in the receive queue, followed by the value of RxCycleCount, which it captured in step in step 206a. Then in step 206e, the Rx continues receiving, decoding and storing the remaining symbols of the message in the receive queue.

In the Reception of data represented in step 206b of FIG. 2, the decoding of the 9 symbols into data can be done in the reverse manner as the transmission was done. Each symbol is received, and then it is looked up to see what bit pattern it represents, and if as in the Tx example above, the received symbol is encoding 12 bits of data, the particular twelve bits are determined based on the symbol received, and these bits can be saved and delivered in packets of 8 bits as components of the message.

Figure 3:
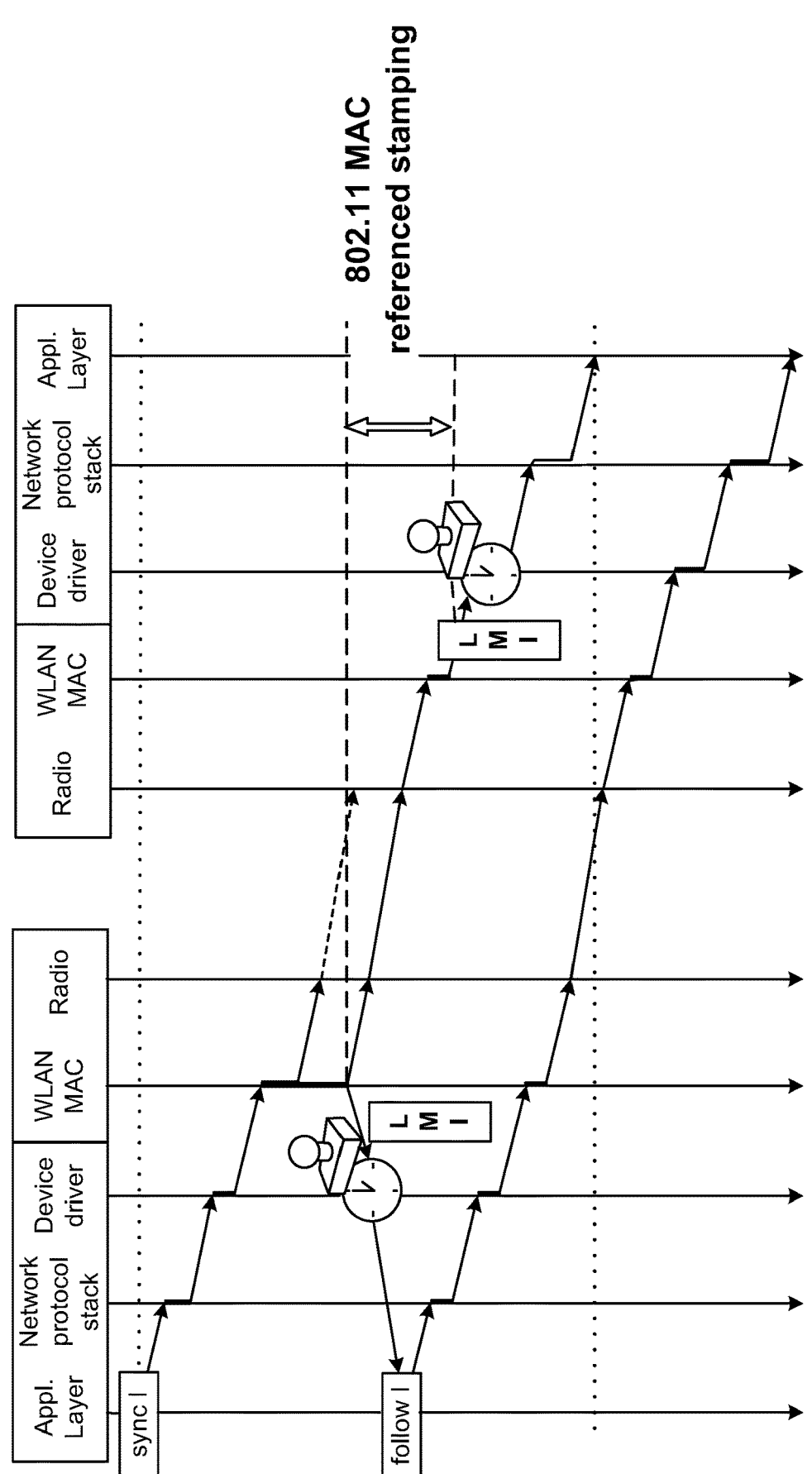
FIG. 3 illustrates a known method for establishing time synchronization between wireless stations using the known Time Synchronization Function.
Figure 4:
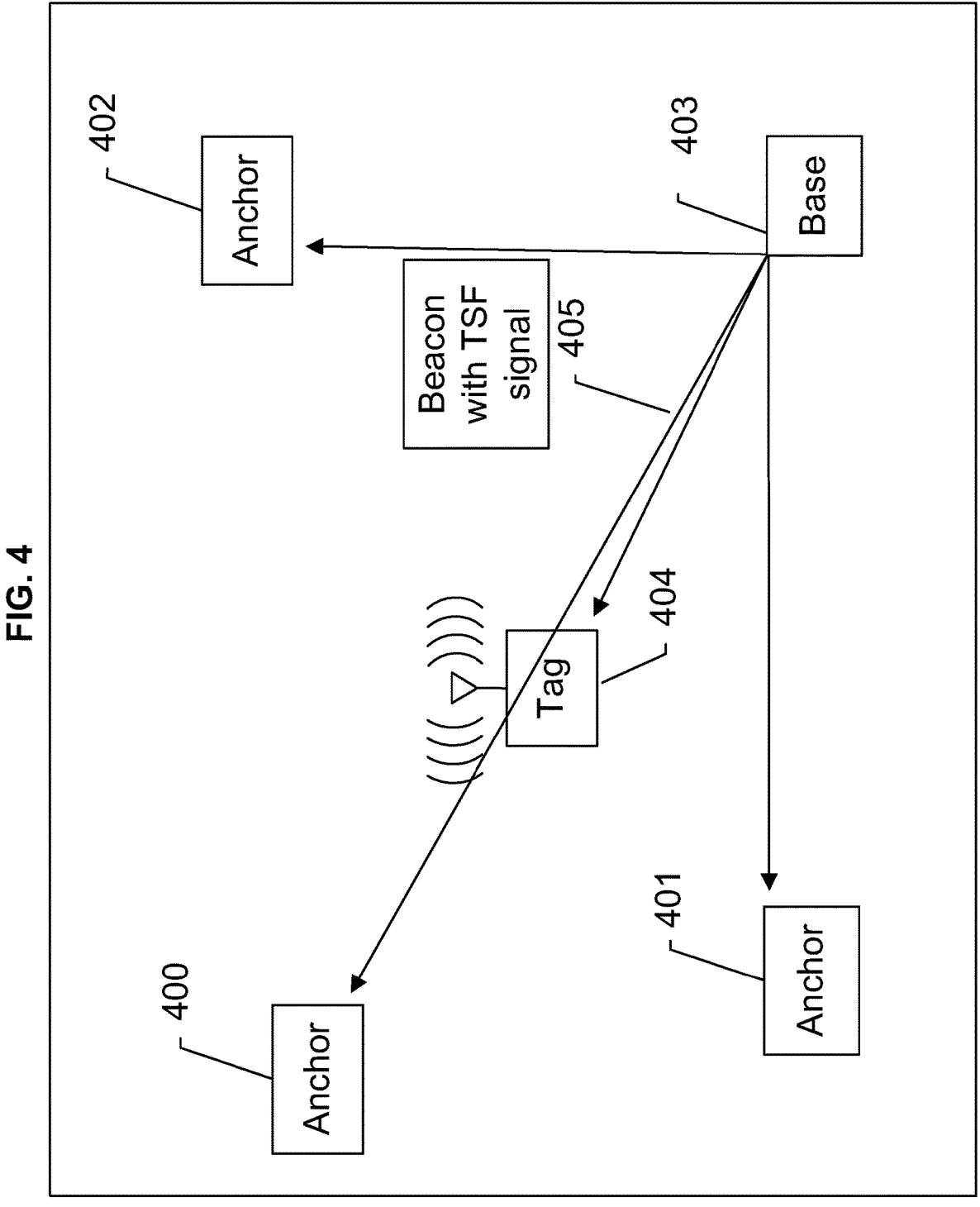
FIG. 4 illustrates the application of the known Time Synchronization Function from FIG. 3 as one way to establish a basis for time synchronization in this disclosure

The Rx machine processes the received Loci symbol and the TxCycleCount and RxCycleCount to determine an accurate distance between the antenna where the message was transmitted to the antenna where the message was received. One example of how to determine location based on two counters is to subtract the TxCycleCount from the RxCycleCount, using the fact that the difference is directly proportional to the time required for the message to travel through the wireless medium from the transmitter to the receiver. As a non-limiting example, one method of establishing the base values of the TxCycleCount and RxCycleCount in a distributed manner is to use the IEEE 802.11-2007 Section 11.1.2.4 "Timing Synchronization Function", which is shown in FIG. 3. In this method, with additional reference to FIG. 4, the Base Station (403) periodically broadcasts a synchronization packet (405) to all of the anchors (400, 401, and 402) and tags (404), which receive this and correct their local clock to match the reference clock, where this clock is adjusted in hardware at the local management interface layer (LMI) to take into account processing delays through the system on both sides, as shown in FIG. 4.

Figure 5:
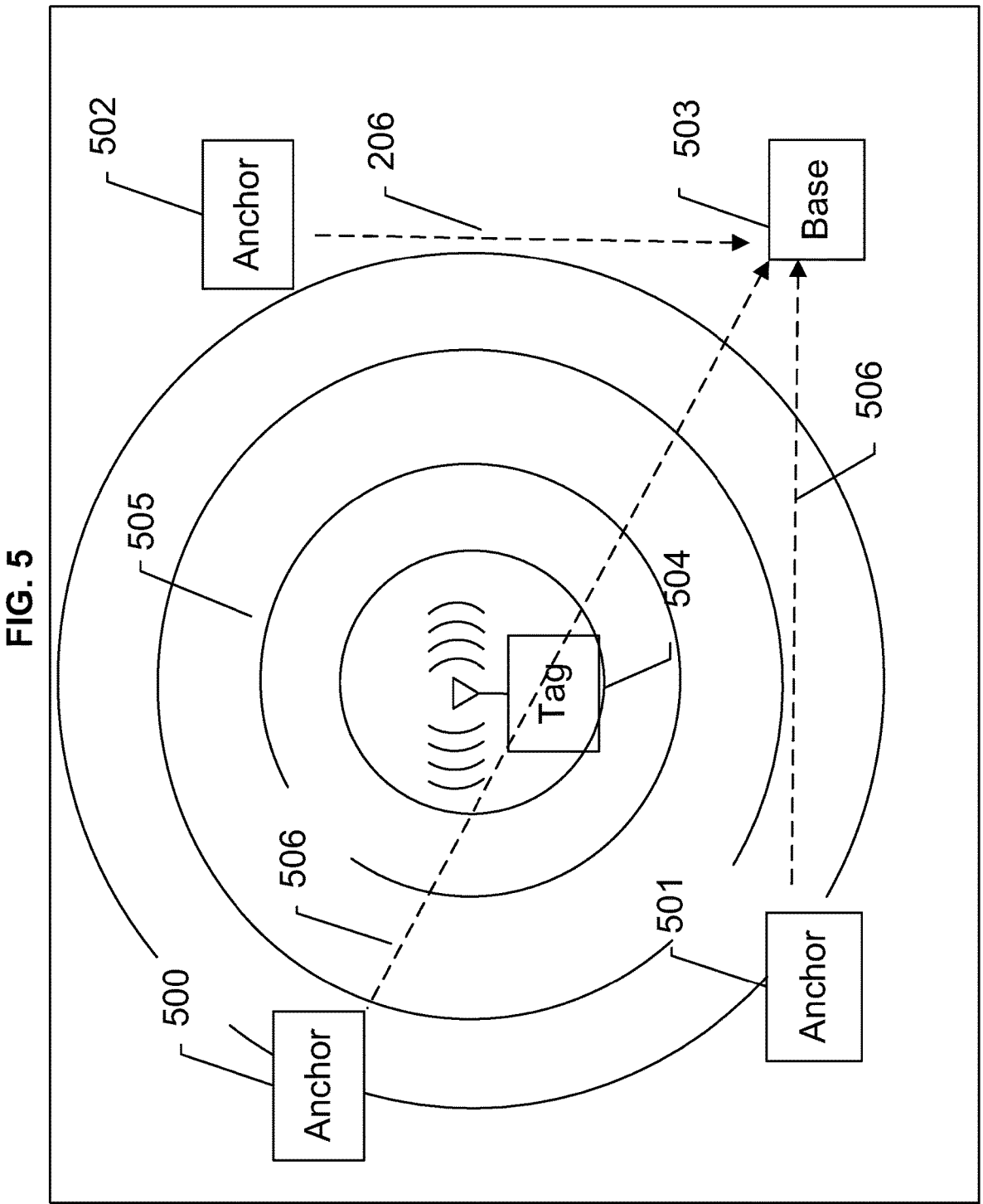
FIG. 5 illustrates a Tag device that transmits a Loci packet, several Anchors that receive the Loci packet and decode the data in the packet and also the distance from the Tag to the Anchor, and transmit this information to a Base station which further processes the data
Figure 6:
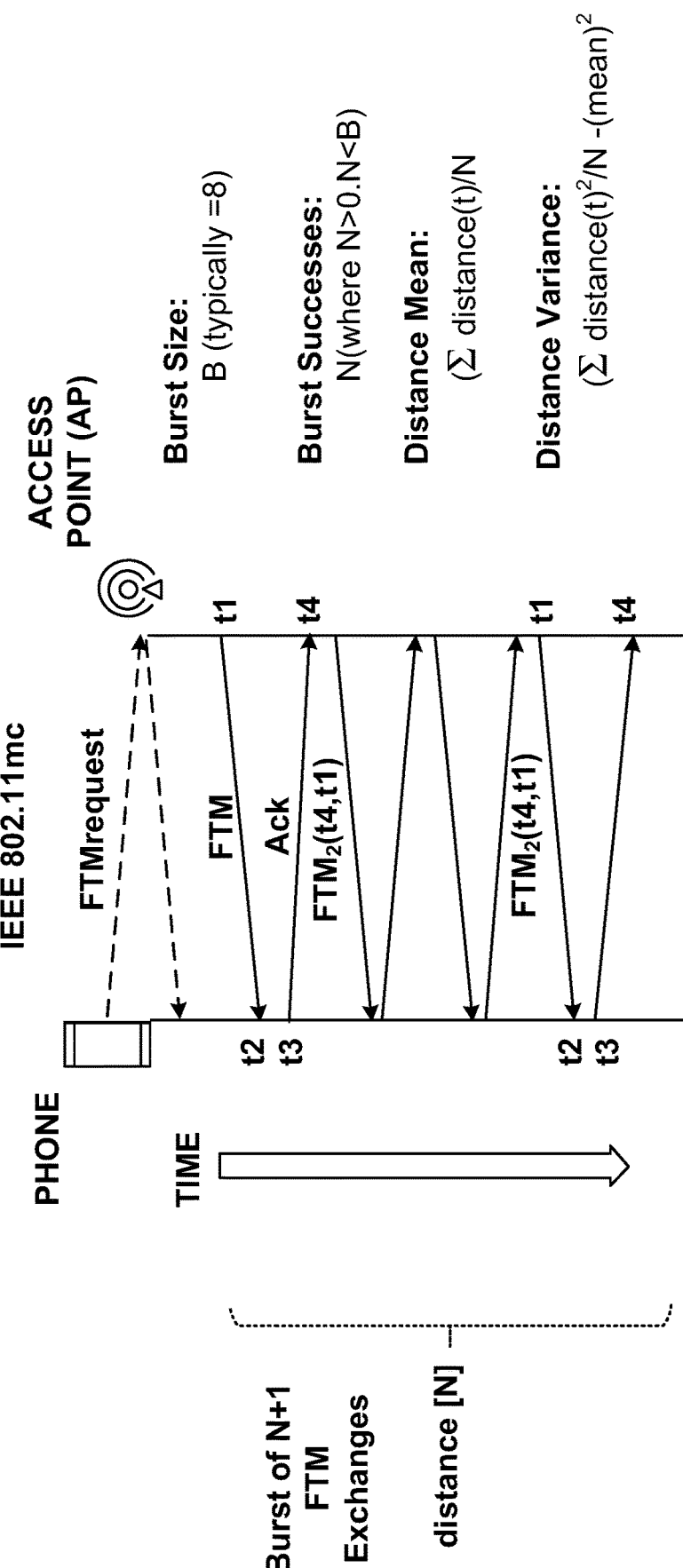
FIG. 6 illustrates a known packet exchange flowchart to determine the distance between two devices using a known Fine Time Measurement ("FTM") protocol.

The disclosed system has each of the many Tags, as shown as item 504 of FIG. 5, configured to gather data from its sensors, then the Tag constructs a Loci packet (as shown in FIGS. 1 and 2) that consists of the preamble (100), the header (101), the special location symbols (103), and the data symbols (102 and 104), which encode the data from the sensor, and typically include the ID number of the Tag device, the Sequence number of message, plus any additional data that is considered helpful (such as battery level, remaining storage capacity, and the like) and broadcasts this packet to the plurality of Anchors which happen to be in range to receive the signal. An example of the special location symbol (103) would be one that is a frequency-rich pulse that gives additional diversity beyond that contained in the preamble or data symbols that are a part of the protocol, which are designed to train an equalizer on just the data channels of the protocol.

The Tags do not need to time stamp the Loci packet; hence they do not need to have or maintain an accurate clock. They do not need to include location information in the packet; hence they do not need to participate in a many-message exchange to determine their location. They do not need to include a GPS positioning radio to have knowledge of their location. Instead they simply form and broadcast the Loci packet to whatever Anchors might be listening.

Each of the plurality of Anchors, as shown as items 500, 501 and 502 in FIG. 5, which receives a broadcast Loci packet (FIG. 1), decodes the data included in the packet (as shown in FIG. 2), which has the Tag ID number the Sequence number and the Sensor data, and then each Anchor determines the distance between the Tag (504) and that Anchor based on analysis of the phase and frequency shift of the special location symbols. As a non-limiting example of this analysis, the Anchor could determine the component of the phase shift that is directly proportional to the distance the signal has traveled combined with the differential Cycle-Count information to determine that distance. The Anchor then aggregates this data from the Tag, together with its calculated distance (as shown by the concentric rings around the antenna of the Tag 504 in the diagram), and adds a data timestamp based on the Anchor's accurate and synchronized clock to the data, and transmits this more complete data as a message (506) delivered at a later time to the Base station, as shown as item 503 in FIG. 5, for the next step in processing. The Anchors themselves do not need to include a GPS positioning radio to determine their location; instead they use the same technique described in this disclosure to determine their relative position with respect to the other Anchors and the Base station.

The Base station (503) receives a plurality of copies (506) of data from each Loci packet that was transmitted by a Tag station (504) and was received by one or more Anchor stations (500, 501, 502), and matches them by their Tag ID number, and further by their Sequence number. The Base station then examines the packets that have a matching Tag ID number and Sequence Number, and performs the triangulation math to determine the precise location of the Tag when it transmitted the particular Loci packet, based on the implicitly derived distance from each of the specific Anchors that received the Loci packet. If three or more Anchors received a given packet, then the x and y coordinates (longitude and latitude) of the Tag when it transmitted the Loci will be known accurately. If four or more Anchors received the Loci, and the Anchors are not located in a single plane, but one or more are at a different altitude than the other Anchors, then the x, y and z coordinates (attitude, longitude and latitude) will be known accurately. If more than four anchors receive a given Loci packet, then averaging techniques are used to further increase the accuracy of the determined location of the Tag when it gathered and transmitted the sample.

The Base station may not process the data immediately; instead, it can store the raw data packet for later processing, perhaps at a remote location. Alternatively (or in addition to storing the raw data), the Base station can perform the data aggregation described in the previous paragraph which updates each data sample with its precise location and the precise time of capture, and then immediately perform additional data analysis techniques including applying machine learning inferencing algorithms on the data as it is collected, and indicate to the system operators immediate steps they can take based on the acquired very accurate data to for example, avoid a dangerous situation, or alter the position of one or more of the sensors to gather additional data about interesting activity in an adjacent area, which might be on the edge of the current sample area.

Use of the disclosed technology will dramatically increase the productivity of many industrial, business and military activities, including, but not limited to the deployment and operation of sensors and communication networks described in the following paragraphs. The productivity increase results from several factors, including (1) greatly reduced installation costs, as there is no need to precisely record the position of each sensor, no maintain and access a database of this information; (2) significantly longer battery life, as there is no need to use battery power to operate a GPS receiver, or an accurate clock at each sensor; nor is there the need to use the wireless media to transmit the inefficient FTM location packets. Taken together these advantages allow an operation to gather the same amount of data more cheaply, or deploy more sensors and hence obtain significantly more data for the same cost of hardware and battery life as the currently existing systems.

Geo-sensing activities: today operators carefully place sensors at hundreds of pre-determined points across a few square miles, each with their location measured with a hand held GPS device, interconnecting the sensors via physical data cables strung across the landscape. With this technology, sensors can be placed at any suitable spot across the area of interest, perhaps determined in the field based on the specific terrain (away from a tree, or large rock), and the network of anchors will determine the location of each sensor as a part of the Loci packet transmission.

Construction activities: today site managers monitor the location of material and activity of each of their workers on a job site by walking around the job site and observing and recording location of people and items throughout the day. With this technology, Tags can be placed on pallets of material, inside the housing of construction equipment including hand held items such as drills and nail hammers, as well as inside larger items such as backhoes and bull dozers, and can be placed inside the safety helmets of construction workers, or embedded inside their employee badge, so that the location and activities of everything can be monitored remotely based on the Loci packets broadcast by the Tags located in the equipment, on the pallets of materials, and on the employees working the job site, and be received by the Anchors located around the job site. This improved data about location of everything will improve the efficiency of the construction activity as needed items can be located quickly. This will improve the safety of the job site, as the location of employees will be known at all times. This will reduce the loss exposure of the job site as unauthorized movement of items will be detected remotely, and the cover of darkness will no longer suffice to hide theft.

Health-care activities: today hospitals are barely contained chaos where doctors and providers and medicines and medical equipment and patients and their visitors are moving chaotically through the system, with the goal to improve the health of everyone moving through the system; but the reality is those who demand the most, and have an idea what to demand, get the most resources applied, but not necessarily the best care. Because we cannot efficiently track what is available at any moment, and what has been used recently, we oversupply things we think might be needed; and discard those items that expire before they are used; driving up costs for everyone. With this technology Tags can be placed on medical supplies, and track not just the location, but also monitor the storage situation of the compounds, what personal (wearing a Tagged badge to gain access to the storage facility) removed the supply, and where the supplies were taken and used; and immediately order replacements. The location of urgently needed equipment (equipped with Tags) can be determined quickly, and unambiguously, and brought to where it is needed. The equipment report results of diagnostics, quantity of supplies on hand, and be maintained with the latest firmware via the same Tag that is used to ascertain it location, insuring equipment is always ready for use.

First Responder activities: Incident commanders must quickly set up infrastructure that enables collection of information about where their people and equipment is, where the threats have been addressed and where they remain. Today they address this with a diverse team of first responders, each with an array of miscellaneous equipment, including smaller mobile systems like radios and video systems, and larger mobile equipment such as paramedic vehicles, police cars and fire trucks. With this technology, Tags can be installed in each item of mobile equipment, and in the helmet or badge of each responder. The incident headquarters can then immediately access the location of each person and piece of equipment. As a further enhancement, sensors in the personal tag could provide health data about the first responder, and some or more of the mobile equipment could be connected to the WiFi service provided by the Tag, forwarding along additional data with the implicit location and timestamps to the incident commander.

Inventory tracking: Wholesale and Retail businesses acquire and track millions of items from their suppliers and make them available for purchase by their customers, and must maintain accurate lists of what they have, where it is, and transfer the desired items to their customer quickly in order to be successful. Today they address this by recording manually on paper, or in a computer data base, each item they receive, and where they store the item (in a warehouse, or on a store shelf), when and to whom they sell the item, and where they transfer the item. Some items are shipped in boxes that have visual, computer readable tags that specify the contents (for example a SKU); this facilitates easier adding of these items to the database as they are received, and subtracting the item as it is sold to a customer. Effective use of these tags requires handheld readers to be used when the item is received, when it is moved, and when it is sold. Left unaddressed is how to find items that are moved from their initially recorded storage location before a customer wishes to acquire the item, either incidentally by a person browsing, or by a purchase that was not recorded, or by theft of the item. With this technology, each item of more than a minimal value could be shipped with a Tag included in the box, which would periodically broadcast its Tag ID, and implicitly its location and the time of the broadcast, as a feature of the Loci. Such broadcasts use so little power, that a Tag would last for more than 3 years using a coin cell battery. This periodic broadcast of the Tag ID enables the warehouse or retail store's systems to know precisely what they have and where it is located. Additionally shipping companies transferring items from place to place would know what they have in each shipping container. As items are moved from their storage location (by a stock person, a prospective customer, or a would-be thief), the system would immediately be aware of this, and update the location, or charge the price of the item to the customer, or dispatch authorities to apprehend the thief, as appropriate.

FIG. 7 is a block diagram illustrating an example computing system 700 upon which any one or more of the methodologies discussed herein may be run according to an example described herein. Computer system 700 may be embodied as a computing device, providing operations of the components featured in the various figures of the present disclosure, including any processing or computing platform or component described or referred to herein. In alternative embodiments, the computing system 700 can operate as a standalone device or may be connected (e.g., networked) to other devices. In a networked deployment, the computing system 700 may operate in the capacity of either a server or a client machine in server-client network environments, or it may act as a peer machine in peer-to-peer (or distributed) network environments.

Example computing system 700 can include a processor 702 (e.g., a central processing unit (CPU), a graphics processing unit (GPU) or both), a main memory 704 and a static memory 706, which communicate with each other via an interconnect 708 (e.g., a link, a bus, etc.). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are a touch screen display. The computer system 700 may additionally include a storage device 716 (e.g., a drive unit), a signal generation device 718 (e.g., a speaker), an output controller 705, and a network interface device 720 (which may include or operably communicate with one or more antennas 750, transceivers, or other wireless communications hardware), and one or more sensors 728.

The storage device 716 can include a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 constituting machine-readable media.

While the machine-readable medium 722 is illustrated in an example embodiment to be a single medium, the term "machine-readable medium" may include a single medium or multiple medium (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of several well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, 4G and 5G, LTE/LTE-A or WiMAX networks). The term "transmission medium" shall be taken to include any intangible medium that can store, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the features in the system architecture 700 of the processing system may be client-operated software or be embodied on a server running an operating system with software running thereon. While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Examples, as described herein, may include, or may operate on, logic or several components, modules, features, or mechanisms. Such items are tangible entities (e.g., hardware) capable of performing specified operations and may be configured or arranged in a certain manner. In an example, circuits may be arranged (e.g., internally or with respect to external entities such as other circuits) in a specified manner as a module, component, or feature. In an example, the whole or part of one or more computer systems (e.g., a standalone, client or server computer system) or one or more hardware processors may be configured by firmware or software (e.g., instructions, an application portion, or an application) as an item that operates to perform specified operations. In an example, the software may reside on a machine readable medium. In an example, the software, when executed by underlying hardware, causes the hardware to perform the specified operations.

Accordingly, such modules, components, and features are understood to encompass a tangible entity, be that an entity that is physically constructed, specifically configured (e.g., hardwired), or temporarily (e.g., transitorily) configured (e.g., programmed) to operate in a specified manner or to perform part or all operations described herein. Considering examples in which modules, components, and features are temporarily configured, each of the items need not be instantiated at any one moment in time. For example, where the modules, components, and features comprise a general-purpose hardware processor configured using software, the general-purpose hardware processor may be configured as respective different items at different times. Software may accordingly configure a hardware processor, for example, to constitute a particular item at one instance of time and to constitute a different item at a different instance of time.

Additional examples of the presently described method, system, and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

Additionally, it should be noted that the terms "including" and "comprising" should be interpreted as meaning "including, but not limited to". In addition, it should be noted that, if not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

From the foregoing, it will be appreciated that although specific examples have been described herein for purposes of illustration, various modifications may be made in the implementation of the invention, or in its application to improve the efficiencies of data collection activities without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

The invention claimed is:

1. A system for integrated wireless data transmission with implicit location and timestamp, the system comprising:
    at least one wireless transmitter with a processor configured to:
        construct a first data packet comprised of one or more preamble symbols, one or more header symbols, one or more data symbols, and one or more location symbols, the one or more location symbols comprising a frequency-rich pulse having a complex waveform with a plurality of different frequencies and different phases; and transmit the first data packet via radio frequency; and at least one wireless receiver configured to receive the first data packet from the transmitter and decode it into a second data packet comprised of one or more preamble symbols, one or more header symbols, one or more data symbols, and one or more location symbols, the decoding of the one or more location symbols comprising analyzing of corresponding frequency shifts and phase shifts in the frequency-rich pulse to determine a distance from the transmitter.

2. The system of claim 1, wherein the receiver is further configured to:

annotate the second data packet to include the distance.

3. The system of claim 2, wherein the receiver is further configured to annotate the second data packet to include a time the packet was received.

4. The system of claim 3, wherein the receiver is further configured to transmit the annotated second data packet to a local or remote base station, and wherein the base station combines data from one or more additional wireless receiving devices with data contained in the annotated second data packet to generate an amended data packet, and transmits the amended data to determine a location and timing of the first data packet transmission.

5. A method for integrated wireless data transmission with implicit location and timestamp, the method comprising:

constructing, via a processor, a first data packet comprised of one or more preamble symbols, one or more header symbols, one or more data symbols, and one or more location symbols, the one or more location symbols comprising a frequency-rich pulse having a complex waveform with a plurality of different frequencies and different phases;

transmitting, via at least one wireless transmitter, the first data packet via radio frequency; and receiving, via at least one wireless receiver, the first data packet and decoding it into a second packet comprised of one or more preamble symbols, one or more header symbols, one or more data symbols, and one or more location symbols, the decoding of the one or more location symbols comprising analyzing of corresponding frequency shifts and phase shifts in the frequency-rich pulse to determine a distance from the transmitter.

6. The method of claim 5, wherein the receiver is further configured to:

annotate the second data packet to include the distance.

7. The method of claim 6, wherein the receiver is further configured to annotate the second data packet to include a time the packet was received.

8. The method of claim 7, wherein the receiver is further configured to transmit the annotated second data packet to a local or remote base station, which combines the data from one or more additional wireless receiving devices with data contained in the annotated second data packet, and transmits to the base station to determine a location and timing of the first data packet transmission.

9. A device for integrated wireless data transmission with implicit location and timestamp, the device comprising:

at least one wireless transmitter with a processor configured to:

construct a packet comprised of one or more preamble symbols, one or more header symbols, one or more data symbols, and one or more location symbols, the one or more location symbols comprising a frequency-rich pulse having a complex waveform with a plurality of different frequencies and different phases; and transmit the packet via radio frequency;

wherein;

the transmitter is implemented to work with another device or system that can receive the packet and decode it into a packet comprised of one or more preamble symbols, one or more header symbols, one or more data symbols, and one or more location symbols, the decoding of the one or more location symbols comprising analyzing of corresponding frequency shifts and phase shifts in the frequency-rich pulse to determine a distance from the transmitter.

10. A device for integrated wireless data transmission with implicit location and timestamp, the device comprising:

at least one wireless receiver configured to receive, from a wireless transmitter, a packet and decode it into a packet comprised of one or more preamble symbols, one or more header symbols, one or more data symbols, and one or more location symbols, the one or more location symbols comprising a frequency-rich pulse having a complex waveform with a plurality of different frequencies and different phases, wherein the receiver is implemented to work with another device or system that is configured to construct a packet comprised of one or more preamble symbols, one or more header symbols, one or more data symbols, and one or more location symbols, the decoding of the one or more location symbols comprising analyzing of corresponding frequency shifts and phase shifts in the frequency-rich pulse to determine a distance from the transmitter.

* * * * *